(12) United States Patent
Strand (10) Patent No.: US 9,710,487 B2
(45) Date of Patent: *Jul. 18, 2017

(54) LOCATION-BASED RANKING

(71) Applicant: Amazon Technologies, Inc., Seattle, WA (US)

(72) Inventor: William Alexander Strand, Issaquah, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/806,904

(22) Filed: Jul. 23, 2015

(65) Prior Publication Data

US 2015/0363428 A1     Dec. 17, 2015

Related U.S. Application Data (63) Continuation of application No. 12/785,847, filed on May 24, 2010, now Pat. No. 9,092,947.

(51) Int. Cl.
| | | |
|---|---|---|
| *G06F 17/30* | (2006.01) | |
| *G07F 17/34* | (2006.01) | |
| *G07F 17/32* | (2006.01) | |
| *H04L 29/08* | (2006.01) | |
| *G06Q 30/02* | (2012.01) | |
| *H04W 4/02* | (2009.01) | |

(52) U.S. Cl.
CPC .... *G06F 17/30241* (2013.01); *G06F 17/3053* (2013.01); *G06F 17/3087* (2013.01); *G06Q 30/02* (2013.01); *G07F 17/3237* (2013.01); *G07F 17/3239* (2013.01); *G07F 17/34* (2013.01); *H04L 67/18* (2013.01); *H04W 4/021* (2013.01)

(58) Field of Classification Search
None
See application file for complete search history.

(56) References Cited

U.S. PATENT DOCUMENTS

| | | | | |
|---|---|---|---|---|
| 7,089,115 | B2 * | 8/2006 | Chapman | G01S 19/14 342/357.52 |
| 8,185,539 | B1 * | 5/2012 | Bhardwaj | G06F 17/30985 707/756 |
| 2004/0242332 | A1 * | 12/2004 | Walker | A63F 13/12 463/42 |
| 2010/0120528 | A1 * | 5/2010 | Mori | A63F 13/12 463/29 |

FOREIGN PATENT DOCUMENTS

WO    2008120495    9/2008

* cited by examiner

*Primary Examiner* — Angela Nguyen
(74) *Attorney, Agent, or Firm* — Thomas | Horstemeyer, LLP (57) ABSTRACT

Disclosed are various embodiments for generating a location-based ranking for a set of measurements. Client devices located within a geographic area are identified. The geographic area is expanded when the quantity of client devices identified within the geographic area fails to meet or exceed a predefined threshold. Additional client devices are identified within the expanded geographic area. A performance ranking of task measurements associated with a performance of a task performed by the client devices within the expanded geographic area is generated.

20 Claims, 5 Drawing Sheets

LOCATION-BASED RANKING

CROSS-REFERENCE TO RELATED APPLICATIONS

This application is a continuation of, and claims priority to, co-pending U.S. patent application entitled "LOCATION-BASED RANKING," filed on May 24, 2010, and assigned application Ser. No. 12/785,847, which is incorporated herein by reference in its entirety.

BACKGROUND

Users of client devices execute a plurality of tasks such as, for instance, read electronic books, play electronic games, communicate through electronic mail, listen to electronic music files and/or other tasks. These tasks typically record a variety of measurements associated with the execution of the task such as, for instance, a high score for an electronic game. Users may sometimes want to get a ranking of the high score with respect to a specified geographic area.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to generating location based rankings. Various embodiments disclosed herein provide for the generation of a geographic ranking of measurements taken in association with the execution of a particular task. In the following discussion, a general description of the system and its components is provided, followed by a discussion of the operation of the same.

Figure 1:
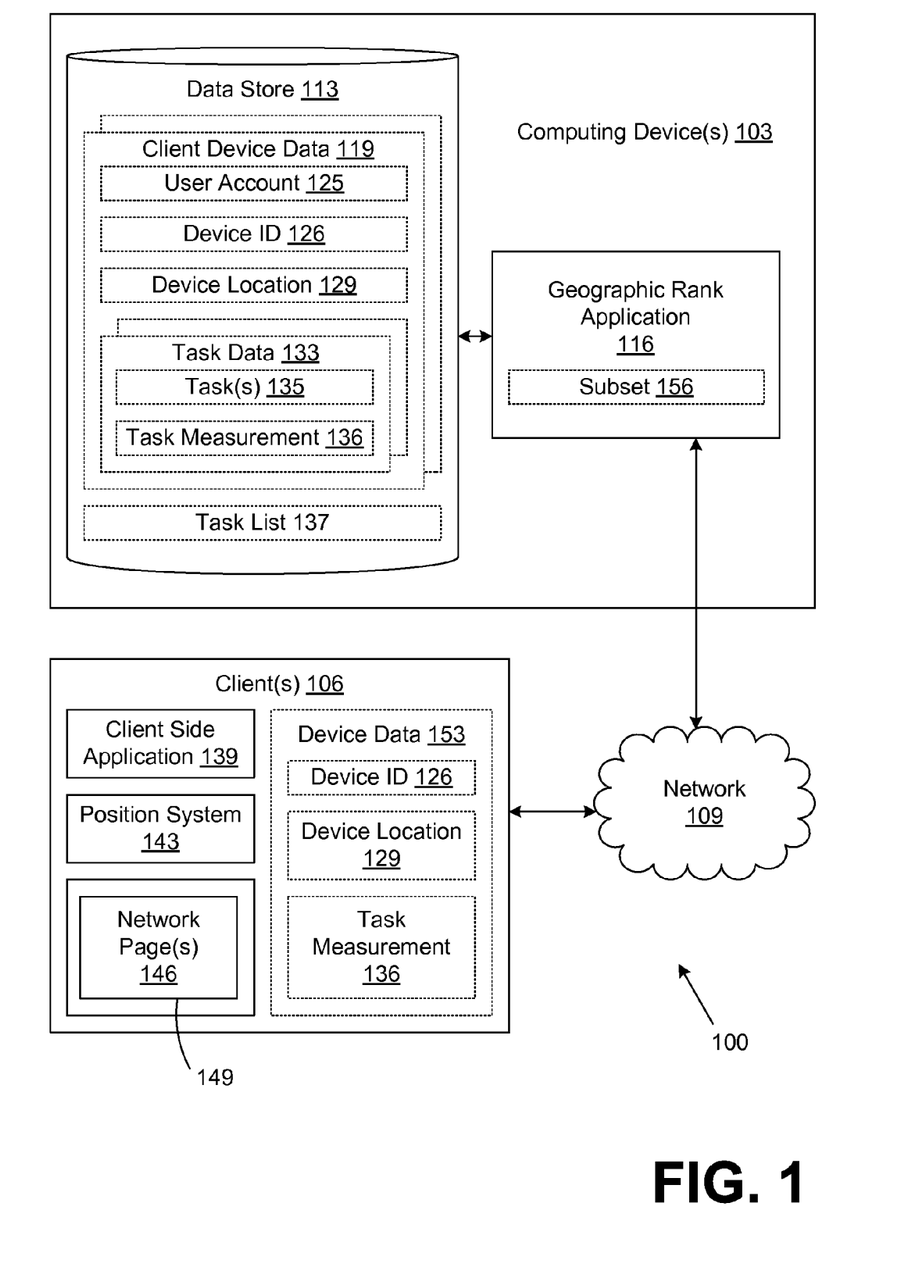
FIG. 1 is a drawing of networked environment according to various embodiments of the present disclosure.

With reference to FIG. 1, shown is a networked environment 100 according to various embodiments. The networked environment 100 includes a computing device 103, a client device 106 and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113, for example, is associated with the operation of the various applications and/or functional entities described below.

The components executed on the computing device 103, for example, include geographic rank application 116, and other applications, services, processes, systems, engines, or functionality not discussed in detail herein. The geographic rank application 116 is executed to generate a ranking for a set of task measurements associated with a specific task from client devices within a geographic area, as will be described.

The data stored in the data store 113 includes, for example, client device data 119 that is associated with a plurality of users, task list 137 that contains a list of tasks available to generate the geographic ranking and potentially other data. The data store 113 may include a plurality of client device data 119 specific to a given user. The client device data 119 contains a user account 125, a device ID 126, a device location 129, and task data 133. In one embodiment, the user account 125 represents a unique user ID used by the geographic rank application 116, such as, for instance, a username, a first and last name, and/or other identifying information. The device ID 126 represents a unique identifier for the client 106, such as, for instance, a media access control (MAC) address. The device location 129 represents a geographic location of the client 106.

Further, the task data 133 specifies a task measurement 136 and a task 135. In one embodiment, the client device data 119 may contain a plurality of task data 133 entries wherein each entry is specific to a given task 135. The task 135 may be a name or other unique identifier for an application that may be executed on the client 106. The task measurement 136 may represent the data collected in association with the execution of the task 135 that indicates a degree of performance of the task 135. The data stored in the data store 113 may be gathered in a variety of ways. In one embodiment, the device ID 126, device location 129, task 135 and task measurement 136 values may be obtained from a plurality of clients 106 by an algorithm administered by the geographic rank application 116 on a periodic basis, as will be described. Finally, the task list 137 may be a list of tasks that are executed by clients 106 for which a task measurement 136 is generated.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game console or other devices with like capability.

The client 106 may be configured to execute various applications such as a client side application 139, a position system 143 and/or other applications. The client side application 139 may be executed in a client 106, for example, to access and render network pages, such as web pages, or other network content served up by the computing device 103 and/or other servers. For example, the client side application 139 may be a browser that renders a network page 146 on a display screen 149 or it may be a dedicated system to render content such as network page(s) 146. The position system 143 may be executed in a client 106, for example, to determine a global position of the device. In one embodiment, the global position of the device may be determined by a system of global positioning satellites, triangulation by a network of cell phone towers, and/or other methods. The client 106 may be configured to execute applications beyond client side application 139 and position system 143 such as, for example, email applications, instant message applications, and/or other applications.

Further, the client 106 may also be configured to include device data 153 such as the device ID 126, the device location 129 and the task measurement 136. In one embodiment, the device ID 126 may represent a unique identifier such as a media access control (MAC) address that may be used to distinguish the client 106 from other devices. The device location 129 may represent the exact position of the device and may be determined by the position system 143. As an example, the device location 129 may be the latitude and longitude of the device, the address, the town, city, state and/or other information indicating the location of the device. Finally, the task measurement 136 may represent a measurement associated with the execution of a specific task 135. In one embodiment, a user having a user account 125 may request the client side application 139, and/or other applications, to execute a plurality of tasks 135. The client side application 139 may store task measurements 136 in the device data 153 for each of the plurality of tasks 135. For example, a task measurement 136 may represent a high score, a time period, a number of chapters read, an amount of data transmitted, and/or any other measurement that may be taken by a task.

Next, a general description of the operation of the various components of the networked environment 100 is provided. To begin, a multitude of users employ various applications on clients 106 to execute or otherwise perform a plurality of tasks 135. The client side application 139 records task measurements 136 associated with the execution of one or more tasks 135 on a given client 106. As an example, the client 106 comprises an electronic book reader. The client side application 139 comprises a back-end application that is configured to generate or access a measurement of the degree of performance of the task 135 on the client 106. In one embodiment, the client side application 139 generates the measurement itself. In another embodiment, the client side application 139 interacts with the application executing the task 135 to obtain the measurement. For example, the task 135 may be rendering chapters on the client, and the task measurement 136 may be total number of chapters rendered. In one embodiment, the task measurement 136 and the corresponding task 135 are automatically obtained by the geographic rank application 116 on a periodic basis and stored in the client device data 119 (FIG. 1). Some users may wish to compare their performance for a particular task to performance by other users of the same task. A ranking of the task measurements 136 for a specific geographic area may be obtained from the geographic rank application 116. For instance, the user may wish to obtain a geographic ranking for the total number of chapters read of a predefined book on the electronic book reader.

To obtain this ranking, the client side application 139 sends a request for a ranking based at least in part on the task measurement 136 for a specific geographic area via the network 109. As an example, the request sent by the client side application 139 may contain the user account 125, the device ID 126, the device location 129, the task 135 and the task measurement 136 taken by the client side application 139. As another example, the request for the ranking may include the geographic area for the ranking and the task 135. Upon receiving the request, the geographic rank application 116 may obtain the user account 125, the device ID 126, the device location 129 and the task measurement 136 from the client 106 if these components are not included in the request. For instance, the computing device 103 may execute an algorithm that periodically obtains the user account 125, the device ID 126, the device location 129 and the task measurement 136. In one embodiment, the automatic algorithm may be administered periodically so that the geographic rank application 116 may have unrestricted access to the above-identified components. Other variations for the content of the ranking request may be used, as can be imagined.

The geographic rank application 116 of the computing device 103 receives and processes the ranking request sent by the client side application 139. The geographic rank application 116 determines the user account 125, the device ID 126, the device location 129, the task 135 and the task measurement 136 from the request and/or in response to the request as described above. In one embodiment, the geographic rank application 116 may store these components in the data store 113 upon receipt.

The geographic rank application 116 also receives the geographic area specified by the client side application 139 to perform the ranking and begins processing the ranking request. In one embodiment, the geographic rank application 116 creates a geographic subset 156a of device IDs 126 that includes those devices found within the geographic area specified by the request. For example, the geographic rank application 116 may create the geographic subset 156a by analyzing the device location 129 for each device ID 126 and placing the device ID 126 in the geographic subset 156a if it is within the specified geographic area. In another embodiment, the geographic rank application 116 may create a geographic subset 156a of user accounts 125 that includes those users found within the geographic area specified by the request. In this example, the geographic subset 156a may be created in a similar manner where the geographic rank application 116 analyzes the device location 129 for each user account 125 and includes the user account 125 in the geographic subset 156a if it is within the specified geographic area.

Upon creating the geographic subset 156a, the geographic rank application 116 may then narrow the geographic subset 156a by identifying a plurality of clients 106 within the geographic subset that executed the task 135 specified in the ranking request. With the narrowed geographic subset 156a, the geographic rank application 116 may then generate the requested ranking. In one embodiment, the geographic rank application 116 may gather the task measurement 136 associated with each of the user accounts 125 and/or the device IDs 126 in the geographic subset 156a that executed the task 135. For example, the geographic rank application 116 may search the client device data 119 by the user accounts 125 and/or the device IDs 126 found in the geographic subset 156a and identify any clients or users that have a task measurement 136 associated with the execution of the specified task 135. Upon identifying these clients and/or users, the geographic rank application 116 may then gather the corresponding task measurements 136. In one embodiment, the geographic rank application 116 may expand the geographic area if a minimum number of clients and/or users are not identified within the specified geographic area. The geographic rank application 116 generates the ranking from the task measurements 136. For example, the geographic rank application 116 may rank the task measurements 136 based on the magnitude of the measurements or other characteristic of the measurements. Finally the geographic rank application 116 returns the geographic ranking to the client side application 139 of the requesting client 106.

In another embodiment, the geographic rank application 116 generates the geographic ranking of the task measurements 136 using a different method, as can be appreciated. For instance, the geographic rank application 116 may first create a task subset 156b by identifying the device IDs 126 from the client device data 119 that are currently executing, or have executed the task 135 specified by the ranking request. As another example, the geographic rank application 116 may create the task subset 156b by identifying the user accounts 125 from the client device data 119 that have executed the task 135 from the client device data 119. Upon creating the task subset 156b, the geographic rank application 116 may then narrow the task subset 156b based at least in part on whether the clients and/or users are located within the specified geographic area. In one embodiment, the geographic rank application 116 may expand the geographic area if a minimum number of clients and/or users are not identified within the specified geographic area. With the narrowed list of device IDs 126 and/or user accounts 125, the geographic rank application 116 may then generate the ranking of the corresponding task measurements 136 to return to the client side application 139. For example, the geographic rank application 116 may return a geographically ranked list of task measurements 136, a geographically ranked list of device IDs 126, a geographically ranked list of user accounts 125, and/or other information revealing the geographic ranking to the requesting client 106.

Figure 2:
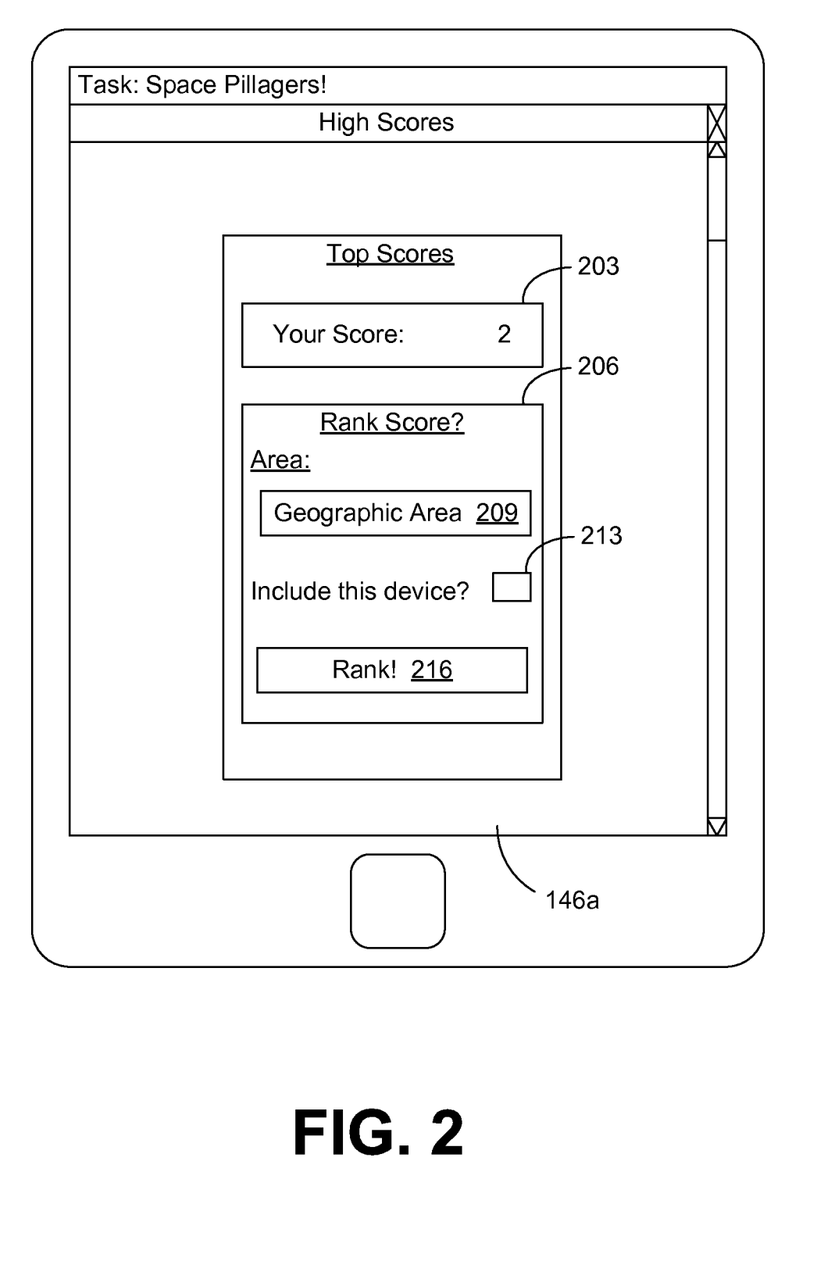
FIGS. 2 and 3 are drawings of an example of a user interface rendered by a client in the networked environment of FIG. 1 according to various embodiments of the present disclosure.

Examples of rendered network page 146 according to various embodiments of the present disclosure will now be described with reference to FIGS. 2-3. Beginning with FIG. 2, shown is an example of a network page 146 (FIG. 1), denoted herein as network page 146a, that may be viewed on client 106 (FIG. 1) according to various embodiments. According to one embodiment, the network page 146a may include a task measurement block 203 and a rank request block 206. The task measurement block 203 displays a task measurement 136 (FIG. 1) recorded in association with the execution of a task 135 (FIG. 1). In this example, the task measurement 136 represents a high score achieved while executing a task 135, such as, for instance, playing a game called "Space Pillagers!" on the client 106.

The rank request block 206 allows a user to generate a geographic ranking request for the task measurement 136 recorded in association with the execution of the task 135. In one embodiment, the rank request block 206 may include a geographic area field 209, a device inclusion toggle 213 and a rank button 216. The geographic area field 209 allows the user to specify a geographic area for which to perform the geographic ranking. For instance, the geographic area may be a neighborhood, a town, a city, a zip code, a state, a country, a continent, a hemisphere, a planet, and/or another geographic area. In one embodiment, the user may specify the geographic area to be based at least in part on the current location of the client 106. For example, the user may specify the geographic area to be the city, zip code, county, state or other area where the client 106 is located. In another embodiment, the user may define the geographic area to be an area determined by a radius around the location of the client 106. For example, the user may define the geographic area to include the area within a 10-mile radius around the location of the client 106. In a further embodiment, the geographic area field 209 may display a map for the user to define the geographic area. In this example, the user may trace an area on the map and outline the boundary of the geographic area. The user may use other methods to specify the geographic area in the rank request block 206, as can be appreciated.

The device inclusion toggle 213 allows the user to specify whether to include the data in the task measurement block 203 in generating the geographic ranking. For instance, the user may request the geographic rank application 116 to include the client 106 in generating the geographic ranking even if the geographic area in the geographic area field 209 does not include the current location of the client 106. Finally, activating the rank button 216 allows the client side application 139 (FIG. 1) to submit the geographic ranking request to the geographic rank application 116.

Figure 3:
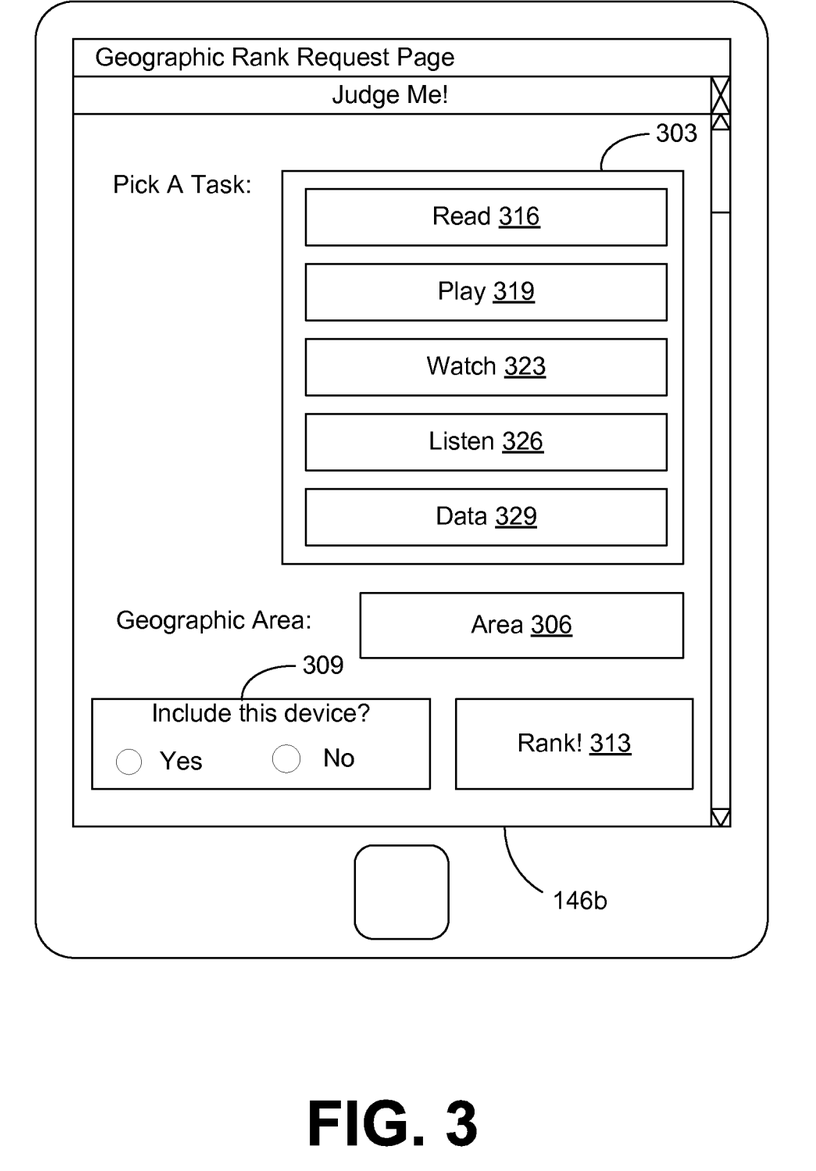

Turning now to FIG. 3, shown is an example of a network page 146 (FIG. 1), denoted herein as network page 146b, that may be viewed on client 106 (FIG. 1) according to various embodiments. According to one embodiment, the network page 146b may include a task block 303, a geographic area field 306, a device inclusion toggle 309 and a rank button 313. The task block 303 displays a categorical list of tasks 135 (FIG. 1) that may be executed by the client side application 139 (FIG. 1). In this example, the task block 303 is organized categorically based on the types of tasks that may be executed by the client side application 139. For instance, the categories of tasks may be entitled read category 316, play category 319, watch category 323, listen category 326, data category 329 and/or other types of categories.

In one embodiment, the user may select a category from the list of tasks in the task block 303. As an example, selecting the read category 316 may prompt the user to choose a task from a list of tasks in the reading category such as, for instance, most chapters read, most books read, fastest to read a book, and/or other tasks in the read category. Selecting the play category 319 may prompt the user to choose a task from a list of tasks in the playing category such as, for instance, highest score in a game, most games played, and/or other tasks in the play category. Selecting the watch category 323 may prompt the user to choose a task from a list of tasks in the watching category such as, for instance, most videos watched, longest video watched, and/or other tasks in the watch category. Selecting the listen category 326 may prompt the user to choose a task from a list of tasks in the listening category such as, for instance, most songs listened to, most number of times listened to one particular song, and/or other tasks in the listen category. Finally, selecting the data category 329 may prompt the user to choose a task from a list of tasks in the data category such as, for instance, amount of data transmitted, amount of data received, and/or other tasks in the data category. In another embodiment, by selecting a category from the task block 303, the user may choose all of the tasks in the category for which to generate the geographic rank. Further, in one embodiment, the user may configure the task block 303 to include other categories of tasks 125 and/or add new tasks 125 to the task block 303. For instance, the client side application 129 (FIG. 1) may provide an appropriate network page 146 to facilitate user specification of tasks.

The geographic area field 306 allows the user to specify a geographic area for which to perform the geographic ranking. For instance, the geographic area may be a neighborhood, a town, a city, a zip code, a state, a country, a continent, a hemisphere, a planet, and/or another geographic area. The user may specify the geographic area using various methods, as discussed above. The device inclusion toggle 309 allows the user to specify whether to include the data from client 106 corresponding to task selected in task block 303 in generating the geographic ranking. For instance, the user may request the geographic rank application 116 (FIG. 1) to include the client 106 in generating the geographic ranking even if the geographic area in the geographic area field 306 does not include the current location of the client 106. As another example, the user may request that the geographic rank application 116 exclude the client 106 and the geographic rank application 116 may generate the ranking without accounting for the client 106. In one embodiment, the device inclusion toggle 309 has a "yes" selection that allows the user to include the client 106 in the geographic ranking and a "no" selection that allows the user to not include the client 106 in the geographic ranking. Finally, activating the rank button 313 allows the client side application 139 to submit the geographic ranking request to the geographic rank application 116.

Figure 4:
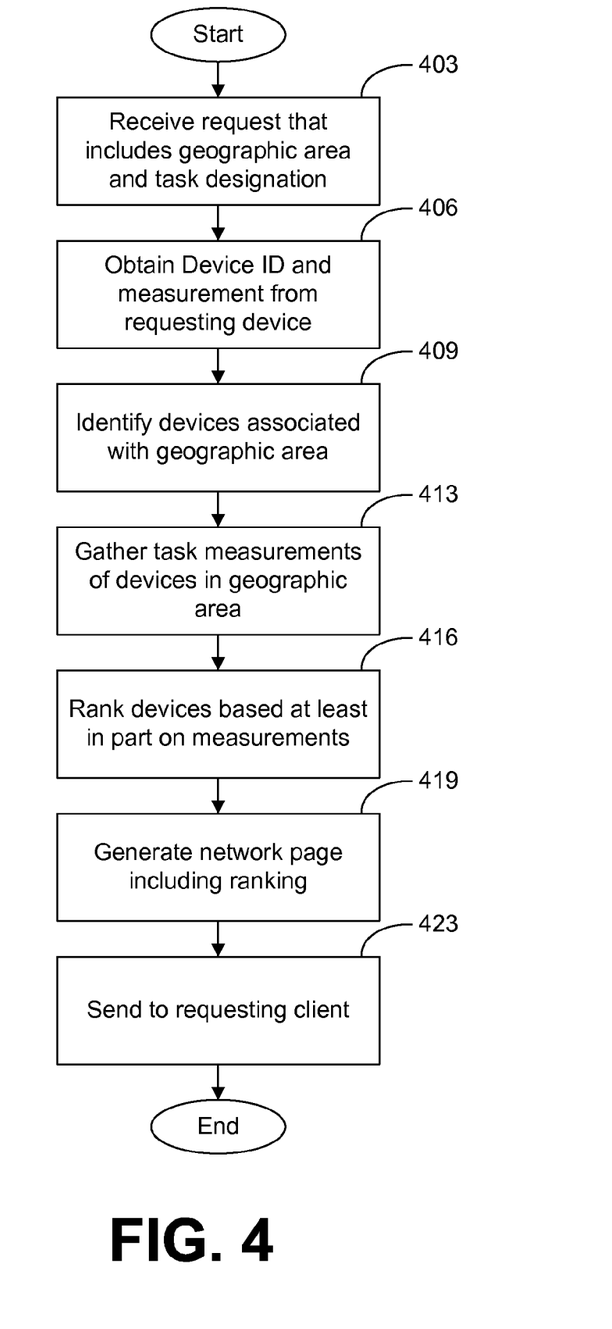
FIG. 4 is a flowchart illustrating one example of functionality implemented as portions of geographic rank application executed in a computing device in the networked environment of FIG. 1 according to various embodiments of the present disclosure.

Referring next to FIG. 4, shown is a flowchart that provides one example of the operation of a portion of the geographic rank application 116 according to various embodiments. It is understood that the flowchart of FIG. 4 provides merely an example of the many different types of functional arrangements that may be employed to implement the operation of the portion of the geographic rank application 116 as described herein. As an alternative, the flowchart of FIG. 4 may be viewed as depicting an example of steps of a method implemented in the computing device 103 (FIG. 1) according to one or more embodiments.

Beginning with box 403, the geographic rank application 116 receives a request for a geographic ranking for a task measurement 136 (FIG. 1) associated with the execution of a particular task 135 (FIG. 1). The request may include the geographic area for the geographic ranking and a task designation for which to generate the geographic ranking. The geographic area may be represented by the name of a neighborhood, a town, a city, a zip code, a state, a country, a continent, a hemisphere, a global area, and/or another geographic area. In one embodiment, the request may define the geographic area to be an area determined by a radius around a location of the client 106. In another embodiment, the geographic rank application 116 may determine the geographic area based at least in part on the location of the client 106. For example, the geographic rank application 116 may acquire the device location 129 (FIG. 1) from the client 106 and determine the geographic area to be the city where the client 106 is located. Other variations to determine the geographic area for performing the geographic ranking may be used, as can be appreciated.

The task designation represents the task 135 (FIG. 1) on which the geographic rank application 116 generates the geographic ranking. In one embodiment, the user may specify the task 135 for which to generate the geographic ranking. For example, the user may select a task from a task list 137 (FIG. 1) for which to generate the geographic ranking. In another embodiment, the geographic rank application 116 may obtain the task designation from the requesting client 106. In a further embodiment, the geographic rank application 116 may provide a task list 137 to the requesting client 106 for which to generate the geographic ranking. The user of the requesting client 106 may then select one or more tasks 135 from the task list 137 for the geographic ranking.

Next, in box 406, the geographic rank application 116 obtains the device ID 126 (FIG. 1) that uniquely identifies the client 106 and obtains corresponding task measurement 136 (FIG. 1) associated with the task designation. In one embodiment, the geographic rank application 116 may acquire the device ID 126 and task measurement 136 from the client 106 upon receiving the geographic ranking request. For example, the geographic rank application 116 may execute an algorithm to automatically acquire these components from the client 106. In another embodiment, these components may be included in the ranking request. In yet another embodiment, the geographic rank application 116 may obtain the user account 125 from the client 106 to uniquely identify the client. In a further embodiment, the task measurement 136 may already be stored in the client device data 119 (FIG. 1) as part of an automatic data acquiring algorithm administered by the geographic rank application 116.

Once the specified inputs have been obtained, the geographic rank application 116 identifies all the client devices associated with the selected geographic area, as shown in box 409. In one embodiment, the geographic rank application 116 may identify these devices by the user account 125 and/or the device ID 126. For example, the geographic rank application 116 may identify devices by the device ID 126 that are associated with the specified geographic area and create a geographic subset 156a. As another example, the geographic rank application 116 may identify devices by the user account 125 that are associated with the specified geographic area and create the geographic subset 156a. With the geographic subset 156a, the geographic rank application 116 may then narrow the subset of device IDs 126 further by identifying only those devices that have a task measurement 136 associated with the specified task 135. Then, as shown in box 413, the geographic rank application 116 may gather the task measurements 136 from the devices found in the narrowed geographic subset 156a.

In another embodiment, the geographic rank application 116 may first identify all devices and/or users that may have recorded a task measurement 136 for the task 135 specified in the ranking request and create a task subset 156b. With the task subset 156b, the geographic rank application 116 may then narrow the subset further by identifying only those devices and/or users that are associated with the specified geographic area. For instance, the geographic rank application 116 may identify the devices by the user account 125 and/or the device ID 126. Once the geographic rank application 116 has narrowed the task subset 156b, the geographic rank application 116 may then gather the task measurements 136 from those devices found in the narrowed task subset 156b.

Next, in box 416, the geographic rank application 116 ranks the task measurements 136 gathered from the devices that executed the task 135 and are located in the geographic area specified by the ranking request. In one example, the geographic rank application 116 may rank the task measurements 136 based on a magnitude of the measurement. For instance, the task measurement 136 may be a high score achieved while playing a task 135 that may be a game called "Space Pillagers!" The geographic rank application 116 may rank the task measurements 136 from the highest measurement to the lowest measurement. As another example, the geographic rank application 116 may rank the task measurements 136 from the lowest measurement to the highest measurement.

Next, in box 419, the geographic rank application 116 may generate a network page 146 (FIG. 1) that includes the geographic ranking. In one embodiment, the geographic rank application 116 may identify the client 106 that originated the measurements in the geographic ranking by the device ID 126 and/or the user account 125. The generated network page may depict the geographic ranking by showing task measurements 136 and the corresponding user account 125 and/or device ID 126 associated with the task measurement 136. Then, in box 423, the geographic rank application 116 sends the network page 146 to the requesting client 106. The client side application 139 of the requesting client 106 may then receive the network page 146 and render it on the display screen 149.

Figure 5:
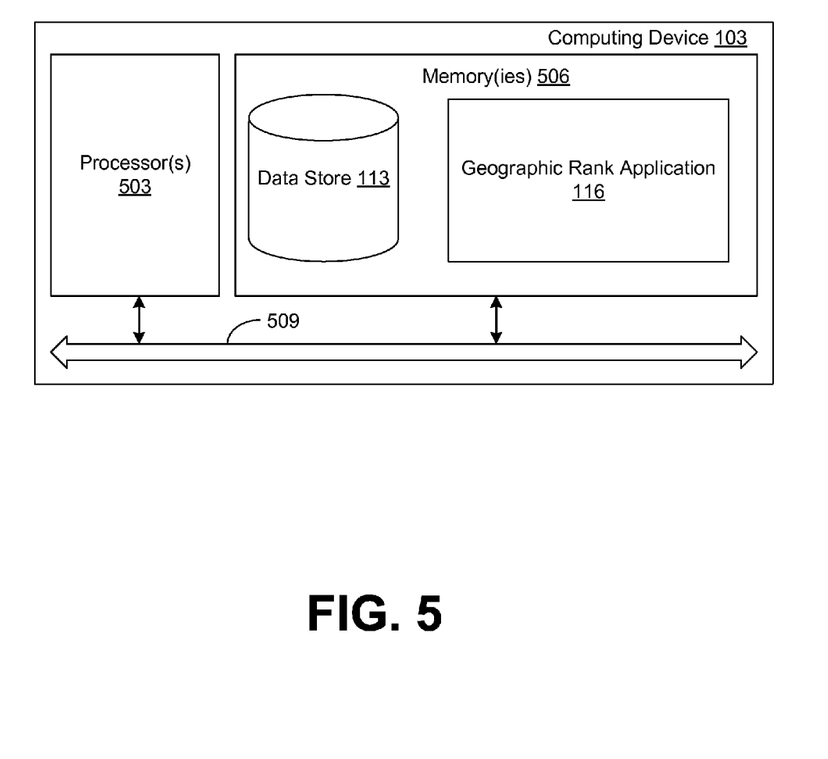
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are geographic rank application 116, and potentially other applications. Also stored in the memory 506 may be a data store 113 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although geographic rank application 116, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the geographic rank application 116. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including geographic rank application 116, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein, when executed, the program causes the at least one computing device to at least:
    identify a plurality of client devices located within a geographic area in response to receiving a request for a performance ranking associated with a performance of a task executed by individual ones of the plurality of client devices, the plurality of client devices being identified based at least in part on client device data received from the plurality of client devices, and the client device data including a respective device location for the individual ones of the plurality of client devices and at least one of: a respective user account, a respective device identifier, or an indication of whether a respective client device has executed or is executing the task;
    expand the geographic area in response to a quantity of the plurality of client devices located within the geographic area failing to meet or exceed a predefined threshold, the geographic area being expanded until the predefined threshold is met or exceeded;
    identify one or more additional client devices based at least in part on the client device data in response to expanding the geographic area; and
    generate the performance ranking based at least in part on a magnitude of a respective task measurement obtained from the individual ones of the plurality of client devices and the one or more additional client devices in response to a task measurement request.

2. The non-transitory computer-readable medium of claim 1, wherein, when executed, the program further causes the at least one computing device to at least send the task measurement request to the plurality of client devices and the one or more additional client devices.

3. The non-transitory computer-readable medium of claim 1, wherein the request for the performance ranking is obtained from a requesting client device being located outside the geographic area.

4. The non-transitory computer-readable medium of claim 1, wherein, when executed, the program further causes the at least one computing device to at least generate a network page depicting the performance ranking, the network page further including the respective task measurement for the individual ones of the plurality of client devices and the one or more additional client devices in an order relative to the performance ranking.

5. The non-transitory computer-readable medium of claim 3, wherein the performance ranking further includes the task measurement associated with the requesting client device.

6. The non-transitory computer-readable medium of claim 3, wherein the request identifies the geographic area and the task, the request being submitted via a user interface rendered on the requesting client device and the task being selected from a plurality of different tasks included on the user interface.

7. A system, comprising:
    at least one computing device; and
    a geographic rank application executable in the at least one computing device, wherein, when executed, the geographic rank application causes the at least one computing device to at least:
        identify a first plurality of client devices that are located within a geographic area, the first plurality of client devices being identified based at least in part on client device data obtained from the first plurality of client devices, and the client device data including a respective client device identifier and a respective device location;
        expand the geographic area in response to a quantity of the first plurality of client devices failing to meet or exceed a predefined threshold;
        identify a second plurality of client devices located within the geographic area in response to expanding the geographic area, the second plurality of client devices including the first plurality of client devices and one or more additional client devices;

determine a subset of the second plurality of client devices based at least in part on whether a task has been performed on individual ones of the second plurality of client devices; and generate a performance ranking of a respective magnitude of individual ones of a plurality of task measurements associated with a performance of the task by the subset of the second plurality of client devices, the plurality of task measurements being received from the subset of the second plurality of client devices in response to a task measurement request.

8. The system of claim 7, wherein, when executed, the geographic rank application further causes the at least one computing device to at least identify the first plurality of client devices in response to receiving a request for the performance ranking from a requesting client device.

9. The system of claim 7, wherein, when executed, the geographic rank application further causes the at least one computing device to at least send the task measurement request to the subset of the second plurality of client devices for task measurement information associated with the performance of the task.

10. The system of claim 7, wherein the plurality of task measurements are received from the subset of the second plurality of client devices periodically.

11. The system of claim 7, wherein, when executed, the geographic rank application further causes the at least one computing device to at least determine whether the individual ones of the second plurality of client devices have performed the task.

12. The system of claim 7, wherein the task comprises at least one of: a number of chapters read from a book, a total number of books read, an amount of time taken to read the book, a number of videos watched, a length of a longest video watched, a number of songs consumed, or a number of times a particular song is consumed.

13. The system of claim 8, wherein the request from the requesting client device includes an additional task measurement associated with the requesting client device.

14. The system of claim 13, wherein the performance ranking further includes the additional task measurement associated with the performance of the task by the requesting client device.

15. The system of claim 14, wherein the requesting client device is located outside the geographic area that has been expanded.

16. A method, comprising:
receiving, via at least one of one or more computing devices, a request for a performance ranking associated with a performance of a task;
identifying, via at least one of the one or more computing devices, a first plurality of client devices that are located within a geographic area based at least in part on client device data obtained from the first plurality of client devices;
determining, via at least one of the one or more computing devices, that a quantity of the first plurality of client devices fails to meet or exceed a predefined threshold;
expanding, via at least one of the one or more computing devices, the geographic area in response determining that the quantity of the first plurality of client devices fails to meet or exceed the predefined threshold;
identifying, via at least one of the one or more computing devices, a second plurality of client devices that are located within the geographic area that has been expanded, the second plurality of client devices including the first plurality of client devices and one or more additional client devices; and
generating, via at least one of the one or more computing devices, the performance ranking of respective magnitudes of a plurality of task measurements associated with the performance of the task by the second plurality of client devices, the plurality of task measurements being obtained from the second plurality of client devices in response to a task measurement request.

17. The method of claim 16, wherein the request is received from a requesting client device, the request including an identification of the geographic area.

18. The method of claim 16, wherein the geographic area comprises at least one of: a place of residency, a place of work, a current location, a neighborhood, a town, a city, a zip code, a state, a country, or a continent.

19. The method of claim 16, wherein the task comprises at least one of: a number of chapters read from a book, a total number of books read, an amount of time taken to read the book, a number of videos watched, a length of a longest video watched, a number of songs consumed, or a number of times a particular song is consumed.

20. The method of claim 17, wherein the request includes a task measurement associated with the requesting client device, and the performance ranking of task measurements further includes the task measurement associated with the requesting client device.

* * * * *